March 23, 1943. J. L. KOPF 2,314,543
COFFEE MAKER
Filed March 28, 1942
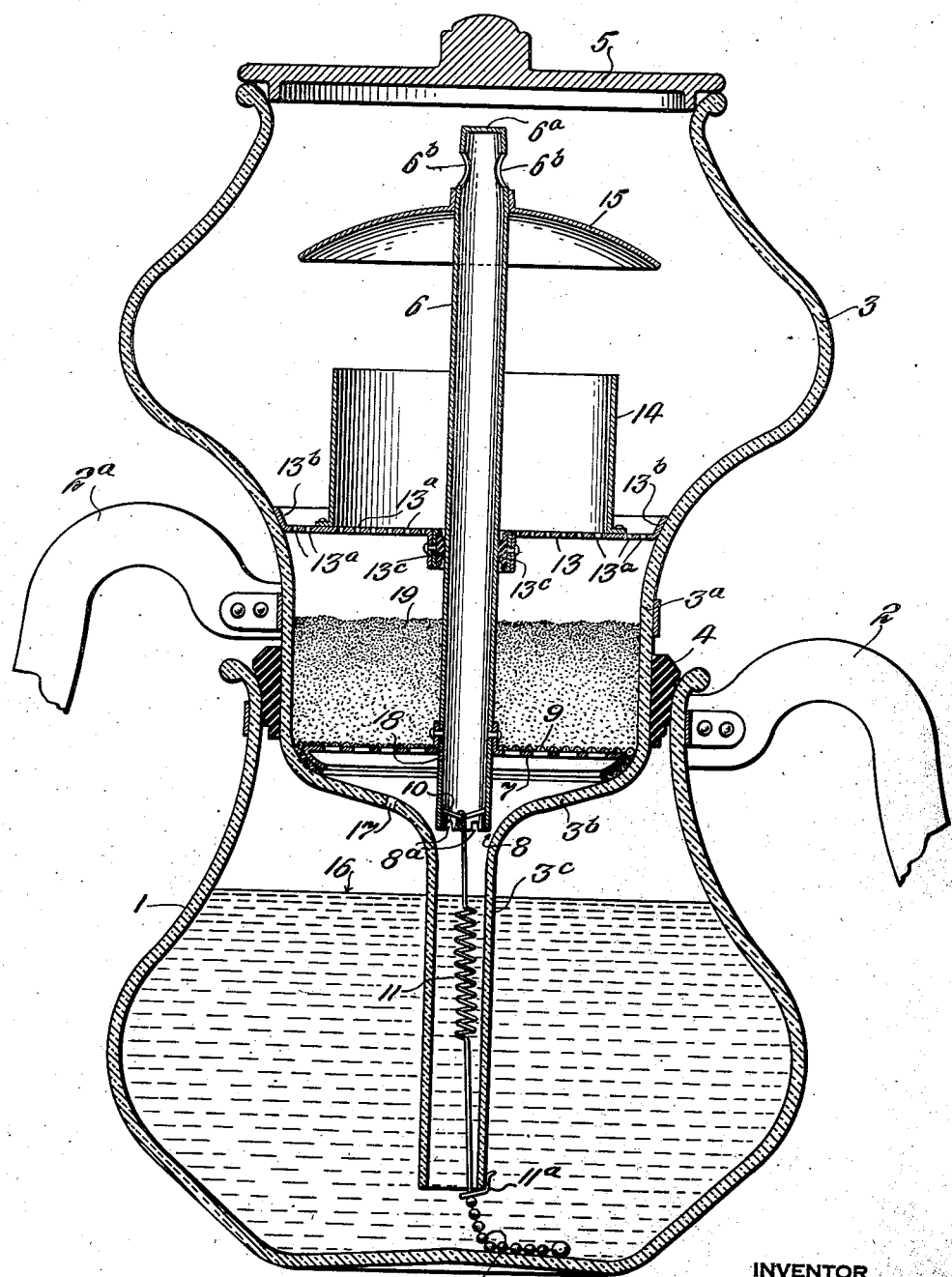
INVENTOR
JOSEPH L. KOPF
BY
Lawrence K. Sager
his ATTORNEY Patented Mar. 23, 1943

2,314,543

UNITED STATES PATENT OFFICE 2,314,543

COFFEE MAKER

Joseph L. Kopf, Maplewood, N. J., assignor to Jabez Burns & Sons, Inc., New York, N. Y., a corporation of New York Application March 28, 1942, Serial No. 436,650

3 Claims. (Cl. 53—3)

This invention relates to improved apparatus for making coffee by the drip method and is an improvement over the invention disclosed in my prior Patent No. 2,232,614, granted February 18, 1941.

As explained in my prior patent the drip method is carried out by passing hot water, preferably near the boiling point, downwardly through a mass of ground coffee into a vessel, the extraction being effected as the liquid passes through the ground coffee.

The main object of the present invention is to simplify the structure of the apparatus and to make it more convenient in assembling the parts for preparing the beverage and in dissembling and cleaning the parts thereafter. Another object is to adapt the structure for making both the infusion vessel and the heating vessel of glass, which is unaffected by the coffee beverage, is easier to clean and increases the interest of the user who can observe the action taking place in the process of making the beverage. Another object is to insure a fixed relationship of the parts in assembling in preparation for making the coffee beverage so that consistent results in making the beverage as regards the amount of extraction from the ground coffee and production of a beverage of excellent quality will be obtained. Other objects and advantages will be understood from the following description and accompanying drawing.

The drawing is a vertical section illustrating a preferred embodiment of the invention.

The heating vessel 1 is of the usual form commonly used in glass coffee makers and is provided with a handle 2. The infusion vessel 3 having a handle 2a is preferably made of glass, is of circular form and is provided with a lower cylindrical portion 3a of reduced diameter, and a bottom sloping portion 3b. This lower portion carries at its center a tube 3c which extends downwardly to a short distance above the bottom of the heating vessel. The portion 3a of the infusion vessel is provided with an external sealing band 4 of rubber, or other suitable material, and removably engages the upper portion of the heating vessel so as to form a sealed joint. The top of the infusion vessel is provided with a loose-fitting cover 5 of glass, metal or other appropriate material, to allow free entrance or exit of gases.

A central tube 6 which may be of glass but is preferably of metal properly plated, such as with chromium, is positioned within the infusion vessel and carries near its lower end a perforated filter plate 7. This plate extends across the lower part of the portion 3a of the infusion vessel and has an inwardly turned lower edge for properly seating itself against the lower part of the portion 3a. The filter plate is fixed to the tube 6 as by welding or riveting and the filter plate positions the tube so that its lower end is adjacent the upper portion of the tube 3c and may form a narrow circular opening 8; or openings such as notches 8a, may be provided at the lower end of the tube 6 in place of the opening 8 or in addition thereto for the purpose of forming a limited passage. This passage serves to permit a limited amount of hot water to pass to the space under the filter and then upwardly into the coffee mass to assist in the expulsion of gases therefrom and also permits the return of the beverage to the lower vessel. A filter cloth or paper 9 extends over the top of the filter plate and may have its outer edge turned under the periphery of the filter plate. A wire 10 extends across the lower end of the tube 6 and is engaged by an extension from one end of a spring 11, the lower end of which is extended and provided with a hook 11a which engages the lower end of the tube 3c. The usual ball chain 12 is attached to the hook for conveniently drawing the hook into engagement with the tube. This connection insures that the filter plate 7 and tube 6 will be properly held in position at all times when the parts are assembled and thereby insure a proper spacing of the lower end of the tube 6 from the upper portion of the tube 3c. Across the upper part of the portion 3a of the infusion vessel is positioned a circular plate 13 having a large number of small perforations 13a. These perforations through the plate are over its entire extent from its inner to its outer portion. The plate is provided with a turned edge 13b which is adapted to seat and fit closely against the top part of the portion 3a of the vessel. The plate has a central opening provided with a yieldable band 13c of rubber or other suitable material. This gives a sufficiently tight engagement with the central tube 6 to retain the plate in position after being assembled.

A cylinder 14 surrounds the tube 6 and is fixed at its lower rim, as by riveting or otherwise, to the plate 13. The cylinder extends upwardly from the plate a sufficient distance to impose a proper pressure head of water for the purpose later described. Likewise the diameter of the cylinder is made such as to cause a suitable pressure head of water to be imposed for proper functioning of the apparatus. The drawing shows this diameter sufficiently large to make the distance from its lower portion to the side of the vessel comparatively small with reference to the distance from the cylinder to the central tube. The cushioned or frictional engagement of the plate 13 with the tube 6 permits the plate and cylinder 14 to be removed from or replaced on the tube.

Near the upper end of the tube is positioned a circular metal plate 15 of convex form turned downwardly. It is spaced above and extends beyond the upper end of the cylinder 14. The plate 15 is removably supported near the upper end of the tube in any suitable manner and for this purpose the upper end of the tube is converged somewhat, as shown in the drawing, for permitting the inner upturned edge of the plate to seat on the converged portion. The upper end of the tube 6 is closed as shown at 6a and below the closed end and above the plate 15 the tube is provided with side openings or holes 6b.

Above the water level 16 of the heating vessel and below the filter plate a small hole 17 is formed in the infusion vessel. This is shown in the drawing as positioned in the inclined converging portion 3b of the vessel but may be located at any other region within the stated limits. Another small opening 18 is formed in the tube 6 close to and below the filter plate 7.

In making coffee beverage, the infusion vessel having been removed from the heating vessel, the latter is filled with water to about the level indicated at 16. Th tube 6 with the filter plate and filter cloth is first inserted in the infusion vessel and held in the position shown by hooking the extension from the spring 11 on the lower end of the tubular portion 3c of the infusion vessel. The ground coffee indicated at 19 is then introduced over the filter plate. The plate 13 with its cylinder 14 is then slid down over the tube 6 to the position shown and is held in that position by the frictional engagement with the tube. The plate 13 is then a sufficient distance above the ground coffee mass for permitting its expansion and movement when the water is introduced. The curved plate 15 is then slipped over the top of the tube and the infusion vessel is closed by the loose-fitting cover 5 and assembled with the heating vessel.

The water in the lower vessel will not pass up the tube 3c before being fully heated because the vent 17 prevents the accumulation of pressure in the space above the water owing to its communication with the atmosphere through the tube 6. But when the water has been brought to the boiling point, this vent is of insufficient size to relieve the rapidly increased pressure above the water with the result that the water is forced up through the tube 3c and the tube 6 out through the openings 6b. The water then falls on the disk 15 from which it falls to the outside of the cylinder 14. The water then accumulates between the cylinder 14 and the side of the upper vessel and builds up a head of water while the water also passes down through the openings 13a at the outside of the cylinder 14. By this method of controlling the passage of the water, it first enters the outside portion of the coffee mass and passes downwardly through it and then inwardly causing the gradual and effective expulsion of the gases in the mass upwardly through the cylinder 14. In the meantime a relatively small amount of water passes through the passage formed by the openings 8, 8a at the bottom of the central tube and penetrates the coffee mass through the filter which assists in the expulsion of the gases upwardly. As the action continues, the water from the top portion of the central tube fills the space outside of the cylinder 14 and then overflows within this cylinder in readiness for passing downwardly through the coffee but before this occurs the free gases, mainly air and carbon dioxide, have been expelled from the coffee mass so that the water above it may uniformly pass downwardly through the mass after the application of heat has been removed from the heating vessel.

As the coffee mass is now uniformly subjected to the action of the hot water, any further gases developed during the contact of the hot water with the coffee particles will rise to the surface of the water. After the discontinuance of the heating, the pressure in the lower vessel returns to atmospheric pressure which permits the water to pass down through the entire mass of coffee uniformly through all parts thereof and through the filter and openings 8, 8a to the heating vessel. In this manner substantially uniform extraction is obtained. The timing of the passage of the water downwardly through the coffee depends upon the size of the openings 8, 8a, the character of the filter, the depth of the coffee mass and the degree of fineness to which the coffee is ground. Such controlling factors are predetermined to obtain the most desirable degree of extraction as regards flavor and aroma and to avoid excessive extraction which would result in a bitter or disagreeable taste. As these factors remain substantially the same after once being determined, the apparatus gives consistent results in proper degree of extraction, strength and pleasing quality of the beverage, each time the apparatus is used. The resulting beverage is not critically dependent upon a particular time interval of application of the heat because the main body of the water remains above the coffee mass until after the discontinuance of the heating, the extraction being accomplished by the downward passage of the body of water through the coffee mass.

The opening 18 in the central tube under the filter plate is for the purpose of imposing atmospheric pressure in the space below the filter and above the inclined portion 3b of the vessel. After the beverage has passed down, a small quantity may otherwise remain in this space. This small amount of beverage is likely to drip from the lower end of the tube 3c after the upper vessel is removed from the heating vessel but by providing the opening 18 the admission of atmospheric pressure to the space below the filter permits this small amount of beverage to pass into the lower vessel before removal of the infusion vessel. It thereby avoids annoying dripping from the tube 3c upon removal of the upper vessel. The parts within the upper vessel are easily cleaned when dissembled as all parts are conveniently accessible.

In some cases the water shedding disk 15 may not be used in which case most of the water from the openings 6b may fall within the cylinder 14. It then builds up a water pressure head within the cylinder which forces the water down through the inner portion of the coffee mass. This forces the free gases from the coffee mass outwardly and upwardly before the water in the cylinder 14 overflows outside of it. All of the coffee particles are thus subjected to an initial uniform wetting with the gases expelled before the downward passing of the main body of water. When the apparatus is used in this manner, the diameter of the cylinder 14 would be made relatively smaller than as shown in the drawing to insure the building up of a sufficient pressure head within the cylinder and a passing of the water initially to a smaller inner portion of the coffee mass. In some cases most of the water may be caused to pass from the tube 6 to the outside of the cylinder 14, even when the disk 15 is not used, in which case the operation would be the same as first described.

Although a preferred embodiment of this improvement is shown and described, various modifications may be made without departing from the scope of the invention. Although the foregoing description is directed particularly to use of the apparatus as a coffee maker, it may be used in the same manner for making other beverages and the claims are intended to cover such other uses.

I claim:

1. A coffee maker comprising a lower heating vessel and an upper infusion vessel removable therefrom and having a sealed joint between them, said infusion vessel having a tube extending within the heating vessel, a removable tube centrally positioned in the infusion vessel and extending downwardly towards the first named tube, a filter plate near the lower end of said removable tube and extending across the lower portion of the infusion vessel, there being a limited annular opening from the space below said filter plate between the lower end of said second tube and the upper portion of said first named tube, a perforated plate positioned above the filter plate and extending across the infusion vessel for forming a space between the two plates for receiving a mass of coffee, and an upwardly extending element fixed to said perforated plate for forming a space for receiving water for making the coffee beverage, said element engaging a limited portion of said perforated plate for causing water to first pass into a limited portion of the coffee mass through a portion of the perforations of said perforated plate for expelling gases from the coffee mass, said element permitting an overflow of water at the upper portion thereof and over the remaining portion of said perforated plate for causing the water to pass downwardly through the entire coffee mass.

2. A coffee maker comprising a lower heating vessel and an upper infusion vessel removable therefrom and having a sealed joint between them, said infusion vessel having a tube extending within the heating vessel, a removable tube centrally positioned in the infusion vessel and extending downwardly towards the first named tube, a filter plate near the lower end of said removable tube and extending across the lower portion of the infusion vessel, there being a limited opening connecting the space below said filter plate with the first named tube for passage of liquid, a perforated plate positioned above the filter plate and extending across the infusion vessel for forming a space between the two plates for receiving a mass of coffee, and an upwardly extending element fixed to said perforated plate for forming a space for receiving water for making the coffee beverage, said element engaging a limited portion of said perforated plate for causing water to first pass into a limited portion of the coffee mass through a portion of the perforations of said perforated plate for expelling gases from the coffee mass, said element permitting an overflow of water at the upper portion thereof and over the remaining portion of said perforated plate for causing the water to pass downwardly through the entire coffee mass, said removable tube having a restricted opening therein below and close to said filter plate.

3. A coffee maker comprising a lower heating vessel and an upper infusion vessel removable therefrom and having a sealed joint between them, said infusion vessel having a tube extending within the heating vessel, a removable tube centrally positioned in the infusion vessel and extending downwardly towards the first named tube, a filter plate near the lower end of said removable tube and extending across the lower portion of the infusion vessel, there being a limited opening connecting the space below said filter plate with the first named tube for passage of liquid, a perforated plate positioned above the filter plate and extending across the infusion vessel for forming a space between the two plates for receiving a mass of coffee, an upwardly extending element fixed to said perforated plate for forming a space for receiving water for making the coffee beverage, means positioned near the upper end of said removable tube for directing water from the upper end thereof to the outside of said element, said element engaging a limited portion of said perforated plate for causing water to first pass into a limited outside portion of the coffee mass through the outer perforations of said perforated plate for expelling gases from the coffee mass, said element permitting an overflow of water at the upper portion thereof and over the inner portion of said perforated plate for causing the water to pass downwardly through the entire coffee mass.

JOSEPH L. KOPF.